United States Patent [19]
Riemenschneider et al.

[11] Patent Number: 5,914,075
[45] Date of Patent: Jun. 22, 1999

[54] PROCESS FOR PREPARATION OF ALKALI METAL CYANIDE GRANULATES

[75] Inventors: Herbert Riemenschneider; Christian Alt, both of Gelnhausen; Martina Claus, Frankfurt; Juergen Loroesch, Hanau; Josef Leutner, Freigericht; Heinz Moench, Bruehl; Ruediger Schuette, Alzenau; Stefan Schulze, Grosskrotzenburg, all of Germany

[73] Assignee: Degussa Aktiengesellschaft, Frankfurt, Germany

[21] Appl. No.: 08/777,397

[22] Filed: Dec. 27, 1996

Related U.S. Application Data

[63] Continuation-in-part of application No. 08/476,373, Jun. 7, 1995, abandoned, which is a continuation-in-part of application No. 08/160,259, Dec. 2, 1993, abandoned.

[30] Foreign Application Priority Data

Dec. 4, 1992 [DE] Germany .............................. 42 40 576

[51] Int. Cl.$^6$ ...................................................... B29B 9/00
[52] U.S. Cl. ............................ 264/7; 23/313 FB; 264/14; 423/371
[58] Field of Search ...................... 264/7, 14; 23/313 FB; 423/371

[56] References Cited

U.S. PATENT DOCUMENTS

| | | | |
|---|---|---|---|
| 3,231,413 | 1/1966 | Berquin | 264/7 |
| 3,323,860 | 6/1967 | Guerin . | |
| 4,107,274 | 8/1978 | Knorre . | |
| 4,213,924 | 7/1980 | Shirley, Jr. | 264/7 |
| 4,353,709 | 10/1982 | Nioh et al. | 23/313 FB |
| 5,383,940 | 1/1995 | Bober . | |

FOREIGN PATENT DOCUMENTS

| | | |
|---|---|---|
| 1144246 | 2/1963 | Germany . |
| 3832883A1 | 3/1990 | Germany . |
| 802091 | 10/1958 | United Kingdom . |
| 836823 | 6/1960 | United Kingdom . |

OTHER PUBLICATIONS

Gehrmann, Dietrich, "Entwicklungstendenzen der Trocknungstechnik in der Chemischen Industrie," Chem.–Ing.–Tech. 62 (1990), vol. 10, pp. A 512, 514, 516, 518, 520.

Ullmann's Encyclopedia of Industrial Chemistry, vol. A8, p. 5, 165–167, 1987.

Chemical Abstracts, vol. 96, Mar. 1982, abstract number 70839m.

Chemical Abstracts, vol. 68, 1968, abstract No. 106506p.

H. Uhlemann in Chem.–Ing. Technik 62 (1990) No. 10, pp. 822–834.

Company document Glatt® AGT (Feb. 92—3000 D (W)), Glatt Ingenieurtechnik GmbH (Weimar, Germany).

*Primary Examiner*—Mary Lynn Theisen
*Attorney, Agent, or Firm*—Beveridge, DeGrandi, Weilacher & Young, L.L.P.

[57] ABSTRACT

New alkali metal cyanide granulates based on sodium cyanide or potassium cyanide and a method for their preparation are disclosed. Commercially available alkali metal cyanide granulates consist of irregular particles; disadvantages are in particular the tendencies to form dust and to cake. The disclosed alkali metal cyanide granulates demonstrate a reduced tendency to cake and virtually no abrasion. The granulates are characterized by essentially spherical particles with particle diameters in the range 0.1 to 20 mm, a bulk density of more than 600 g/dm$^3$, an abrasion of less than 1%, and a caking index of at most 4. The granulates can be prepared by fluidized bed spray granulation involving spraying an aqueous solution containing alkali metal cyanide onto alkali metal cyanide nuclei in a fluidized bed and evaporating the water.

24 Claims, 2 Drawing Sheets

5,914,075

PROCESS FOR PREPARATION OF ALKALI METAL CYANIDE GRANULATES

REFERENCE TO A RELATED APPLICATION

This application is a continuation-in-part of application Ser. No. 08/476,373, filed Jun. 7, 1995, now abandoned, which application is entirely incorporated herein by reference, which application is a continuation-in-part of application Ser. No. 08/160,259, filed Dec. 2, 1993, now abandoned.

INTRODUCTION AND BACKGROUND

The present invention relates to new alkali metal cyanide granulates based on sodium cyanide or potassium cyanide, whose particles are essentially spherical and which are characterized by extraordinary properties as compared with previously known granulates, including minimal abrasion and a greatly reduced tendency to cake. The present invention also concerns a process for preparing such granulates.

The two alkali metal cyanide salts sodium and potassium cyanide are used to prepare electrolytic baths and hardness salt baths as well as for the synthesis of organic compounds. In addition, sodium cyanide is used in large amounts to recover gold by the cyanide leaching of ores.

Due to their toxicity, the alkali metal cyanides mentioned are preferably handled in the compressed form or as low-dust milling granulates. Sodium and potassium cyanide granulates which are produced commercially on a large scale consist of irregularly shaped particles with a particle size distribution which ranges between, for example, about 0.2 and 4 mm. Compressed products are produced using rotating roller presses or ram presses. The granulates are prepared by crushing the pressed discs using a milling device. The irregular shape of this type of granulate is the reason for the undesired dust formation during handling procedures.

Known NaCN and KCN commercially available compressed products, milling granulates and powders have a strong tendency to agglomerate and cake on the internal surfaces of piping, fittings and equipment made of steel or stainless steel. The tendency to agglomerate and cake increases with decreasing particle size and in particular with increasing humidity and applied load, and makes handling procedures, such as storing in silos, weighing out and transporting, difficult and expensive.

Due to these difficulties, the present inventors looked for a form of supply which did not tend to agglomerate and cake, or at least had a lower tendency to do so. Although NaCN filter cakes which were prepared by known methods could be converted into an approximately spherical granulate and then dried, the resulting NaCN granulate had too low a bulk density, less than 600 g/dm$^3$, and the resistance to abrasion was unsatisfactory.

A further disadvantage of the previously known sodium and potassium cyanide granulates was the technically complicated process of preparation, which comprised several steps and which started with aqueous NaCN and KCN solutions respectively. In the first step, the alkali metal cyanide is crystallized out of solution, this being performed, for example, in a vacuum crystallizer. The crystallized product is separated from the mother liquor using known techniques. After a single- or multi-stage drying procedure, the alkali metal cyanide powder is compacted to give a compressed product, the latter being crushed to give the granulate mentioned. Thus the process requires not only a large investment in equipment and service personnel, but the evident tendency of NaCN and KCN to cake forces stoppages and reduces the availability of the whole plant.

Glatt Ingenieurtechnik GmbH (Weimar, Germany), in their company document Glatt® AGT (Feb. 92-3000 D (W)), describe a plant for continuous granulation and drying which is based on the principle of the technique also known as fluidized bed spray granulation (see H. Uhlemann in Chem.-Ing. Technik 62 (1990) no. 10, pp. 822–834) and describe its application to, inter alia, "carbonates and cyanides". However, it is not evident from the company document mentioned whether this refers to alkali metal, alkaline earth metal or heavy metal cyanides or to complex cyanides. Also, neither data on the properties of the cyanide granulates nor the conditions of production of the same can be gathered from the company document.

SUMMARY OF THE INVENTION

An object of the present invention is thus to provide alkali metal cyanide granulates based on sodium or potassium cyanide which have reduced disadvantages compared to the commercial granulates described above. A further object is directed at providing a method which allows the new granulates to be produced in a simpler manner, in particular with less complicated apparatus and fewer staff, than was the case with the previously mentioned processes.

Alkali metal cyanide granulates based on sodium or potassium cyanide were developed which have the following characteristics:

(i) essentially spherical particles with smooth or raspberry-like surface structures;

(ii) individual particle diameters in the range from at least 0.1 mm to 20 mm for at least 99% by wt. of the granulate;

(iii) a bulk density of at least 600 g/dm$^3$, (iv) an abrasion of less than 1% by wt., measured in the roller abrasion test (TAR abrasion tester from Erweka using 20 grams, 60 min, 20 rpm); and (v) a caking index of at most 4, measured after applying a load of 10 kg to 100 g in a cylinder with an internal width of 5.5 cm for 14 days.

BRIEF DESCRIPTION OF THE DRAWING

The present invention will be further understood with reference to the drawings, wherein.

DETAILED DESCRIPTION OF THE INVENTION

Figure 1:
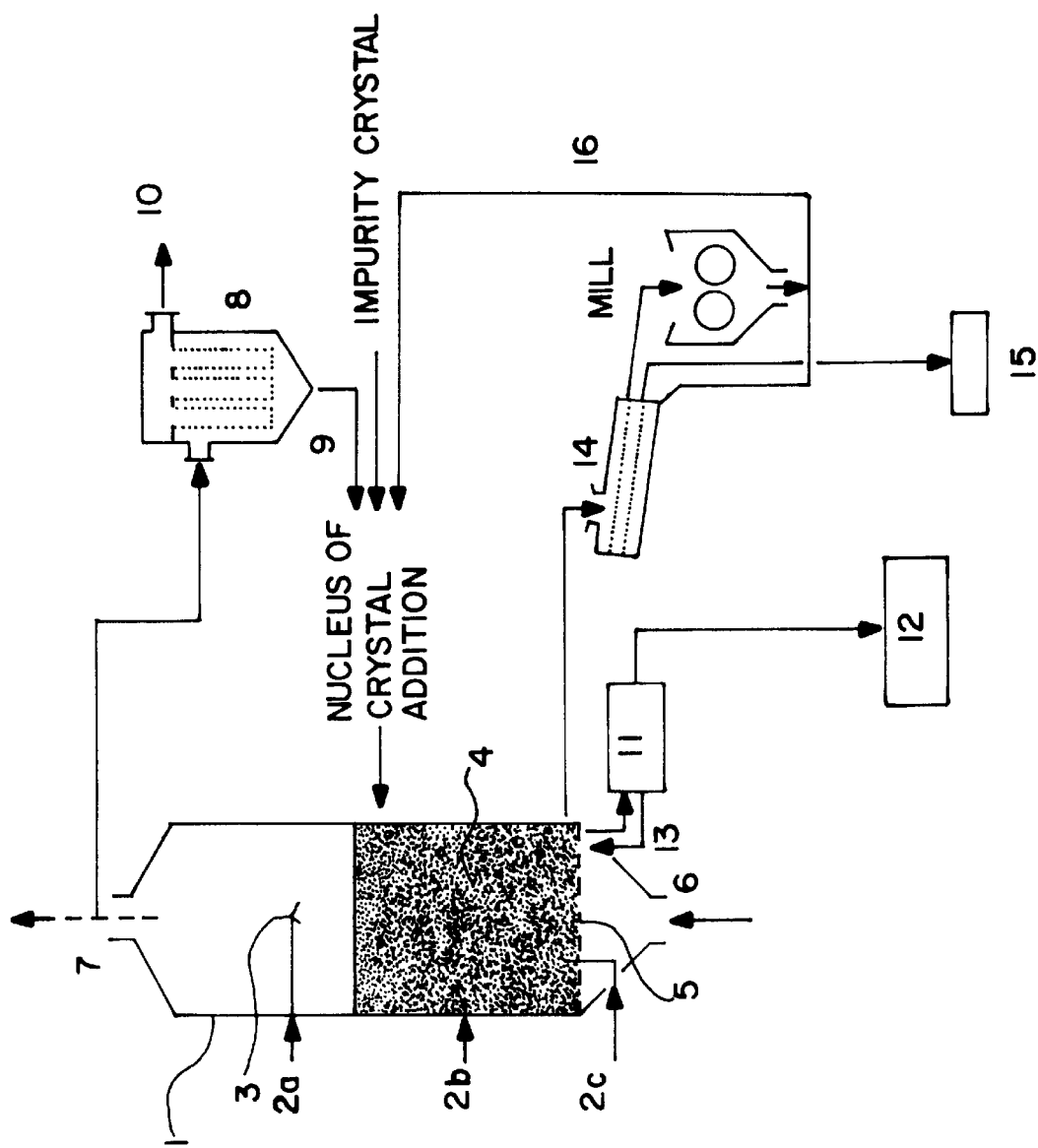
FIG. 1 is a schematic flow diagram of process variations of a fluidized bed spray granulator according to the invention.

Alkali metal cyanide granulates according to the present invention have in general a content of at least 80% by wt., preferably at least 93% by wt., of sodium or potassium cyanide. Surprisingly, residual moisture may be present up to a maximum of 5% by wt., but is preferably present in an amount of less than 3% by wt, and in particular less than 1% by wt. The granulate product may also contain side products which depend on the raw materials and process, such as alkali metal hydroxide, alkali metal formate and alkali metal carbonate. These side products may also be present in larger than customary amounts and/or other auxiliary substances may be present in order to modify certain properties of the granulate in a deliberate manner.

Production of alkali metal cyanide granulates with elevated water contents, from more than about 1% by wt. to 5% by wt., leads to a saving of drying energy. This type of granulate is of economic interest if the consumer dissolves the granulate in water in any case. Contrary to expectations, granulates according to the present invention with elevated water contents are surprisingly also sufficiently resistant to caking.

In the mining industry, for example, it is of interest to obtain sodium cyanide with a higher sodium hydroxide content than the 0.2 to 0.6% by wt. customarily present because sodium hydroxide is generally added during the production of dilute, aqueous solutions in mines. The production of sodium cyanide granulates with an NaOH content of up to a maximum of 3% by wt. presents no problems.

The other auxiliary substances may be distributed uniformly in the individual granulate particles or they may be distributed uniformly on the surface of the granulate particles. The auxiliary substances are, for instance, anti-caking agents, which are suitable for further reducing the tendency to cake of the alkali metal cyanide granulates according to the present invention, which is already surprisingly reduced as compared with the commercially available granulates. A reduced tendency to cake of this type is of importance if the granulate has to be temporarily stored in silos, in particular in climatically humid areas. Anti-caking agents may be present in effective amounts in or on the granulates; here, effective means that the caking index is lower due to the presence of the anti-caking agent than in its absence. Granulates which contain anti-caking agent preferably have a caking index of at most 3.

Suitable anti-caking agents may be selected, for example, from the group of hydrophobic organic compounds such as Na or K salts of higher fatty acids. Another group consists of natural and synthetic silicas and/or silicates. Although hydrophobic silicas and silicates are not excluded, hydrophilic substances are generally preferred because there are then no wetting problems with the granulate in aqueous systems. Silicates which are alkaline in aqueous dispersion are particularly preferred, in particular (Na, Ca) silicates (silicate containing both calcium and sodium as cation) and sodium aluminum silicates.

The amount used of the preferably hydrophilic silicates is between 0.1 and 5% by wt. in the case of uniform distribution within the granulate particles. Provided one or more of the silicates is located essentially on the surface of the granulate, the amount used is generally between 0.01 and 4% by wt., in particular between 0.1 and 2% by wt. Preferred silicates have a BET surface area (measured by DIN (German Industrial Standard) 66131) of about 30 to 120 $m^2/g$ and a pH in a 5% strength aqueous suspension of 7 to 12, in particular 9 to 12. The major components are in the range 40 to 92% $SiO_2$, 0 to 36% $Al_2O_3$, 2 to 22% $Na_2O$, 0 to 6% CaO; particularly preferred silicates consist of 90 to 92% $SiO_2$, 5 to 7% CaO, and about 2% $Na_2O$.

The amount of organic hydrophobic agent used, such as e.g. Na or K stearate, which are admixed with the final granulate and are thus located essentially on the surface of the particles, is 0.1 to 4% by wt., in particular 0.1 to 2% by wt. This type of hydrophobic agent slows down the absorption of moisture by hygroscopic alkali metal cyanides from the air and reduces the tendency to agglomerate.

The essentially spherical granulate particles have a smooth or raspberry-like surface structure. The expression "essentially" indicates that slight deviations from the spherical form, for example slightly ovoid shapes, are included.

The diameter of the individual particles of NaCN and KCN granulate according to the present invention is essentially in the range from at least 0.1 mm to 20 mm. The expression "essentially" indicates that at least 99% by wt. of the granulate lies within the range. A preferred range is between 1 and 10 mm. Granulates produced by the process according to the present invention are further characterized in that the particle size range is very narrow. For an average particle diameter in the range from 2 to 9 mm, the diameter of the particles is essentially in the range of the average particle diameter plus or minus less than 1 mm, preferably plus or minus less than 0.5 mm.

The bulk density of the granulate is of technical importance. Generally the bulk density is above 650 $g/dm^3$, preferred granulates have a bulk density of greater than 700 to 950 $g/dm^3$. In view of the toxicity of alkali metal cyanides and thus the high investment in packaging which is required, specialists are interested in as high a bulk density as possible. As already explained above, it has hitherto proved difficult to produce granulates which have the combination of properties in accordance with the present invention with respect to shape and size of particles, minimal abrasion, and reduced tendency to cake, and which at the same time have a high bulk density in the desired range.

The caking index of the granulates according to the invention is at most 4, preferably at most 3. The caking index, also called the crushing strength, is determined by applying a load to the samples under specific conditions and is evaluated by using an assessment scale. To perform this procedure, 100 g samples are placed in a tubular cylinder with de-airing holes ($\phi$ 1 mm) and an internal width of 55 mm, placed vertically on a base, and a 10 kg load is applied by means of a ram. The loading period is 14 days at room temperature (20° to 25° C.) and atmospheric humidity (50 to 70% relative humidity). After removing the ram, the cylinder is lifted off and the caking behavior assessed.

| Index | Criterion |
| --- | --- |
| 1 | completely unchanged; smooth flowing |
| 2 | some loose cohesion; readily disintegrates into the original state |
| 3 | loosely molded; mostly disintegrates under slight finger pressure |
| 4 | loosely agglomerated: still disintegrates with moderate finger pressure |
| 5 | semi-solid; no longer disintegrates under finger pressure |
| 6 | firmly molded |

Granulates according to the present invention are essentially resistant to abrasion, wherein particles smaller than 0.1 mm are understood to be the result of abrasion. The spherical shape of the granulates leads to virtually no abrasion. Abrasion, measured in the roller abrasion test (TAR abrasion tester from Erweka Apparatebau GmbH, Heusenstamm, Germany, using a 20 g sample, 1 hour rotating at 20 rpm) is less than 1% by wt., generally less than 0.5% by wt. In contrast, abrasion of a commercially available granulate, sieved to give particles larger than 1 mm, is 2 to 3% by wt. If a granulate prepared according to the present invention is compared with a comparable sieve fraction of a commercially available granulate, the abrasion of the granulates according to the present invention is surprisingly generally less than one tenth of the value of the corresponding fraction of the commercially available granulate. The good pourability of granulates according to the present invention and the high resistance to abrasion contribute greatly to easier and safer handling.

As explained above, sodium cyanide granulate and potassium cyanide granulate according to the present invention have much better material properties in several respects, which are relevant in practical situations, as compared with commercially available granulates. Granulates according to the present invention are pourable and form virtually no dust during handling, in contrast to commercially available granulates. The granulates can be stored in silos due to their greatly reduced tendency to cake and be withdrawn as needed, this being virtually impossible with previously known granulates. Silo vehicles can be readily emptied and the washing-out procedure which has hitherto been required is unnecessary. It could not have been predicted that the material properties in accordance with the present invention could be combined in one and the same granulate.

A process was found for preparing the alkali metal cyanide granulates based on sodium cyanide or potassium cyanide according to the present invention which is characterized in that an aqueous solution or suspension containing at least 10% by wt. of alkali metal cyanide is sprayed onto a fluidized bed consisting of alkali metal cyanide nuclei in a device for fluidized bed spray granulation, the water is evaporated off using a current of drying gas (whose temperature is 150° to 450° C.) flowing through the fluidized bed (wherein the temperature of the fluidized bed is 90° to 350° C.), and granulate is withdrawn from this device in a manner which is known in the art, and dust which is produced is returned thereto.

The structure and method of operation of a fluidized bed spray granulation device to be used according to the present invention can be found in H. Uhlemann, Chem.-Ing. Technik 62 (1990) no. 10, pages 822–834 which is incorporated by reference. The drying gas is generally air, and either compressed air or ambient air may be used. With regard to the ready formation of alkali metal carbonates from the alkali metal cyanide solution and carbon dioxide from the air, the use of ambient air is preferred. The drying air emerging from the fluidized bed spray granulator is thus reheated, after drying, and used to operate the granulator. The initial temperature of the drying gas is generally in the range between 150° and 450° C., preferably above 200° C. The drying gas leaves the granulator in general at a temperature between 70° and 300° C., preferably above 110° C.

FIG. 1 shows a fluidized bed spray granulator from H. Uhlemann, Chem.-Ing. Technik 62 (1990) no. 10, pages 822–834 (FIG. 9). In the fluidized bed granulator (1), the liquid is introduced to the fluidized bed (4) via ports (2); the liquid is introduced above the fluidized bed through the port (2a) via a spray nozzle (3) or from the side of the fluidized bed through the port (2b) or from the bottom of the fluidized bed through the port (2c). Material is prevented from exiting from the bottom of the granulator by a retaining screen bottom (5). Fluidizing air enters the fluidized bed via an inlet (6). Exhaust air exits the granulator via an outlet (7) without recycling of the fine particulates or the exhaust air is sent through a dust filter (8) and the fine particulates are returned to the fluidized bed via line (9); the exhaust exits via outlet (10). The product is sent through a sifter (11) with the product particles and larger particles being collected (12) and the fine particulates being returned (13). Alternatively, the product is passed through a screen (14) and the product particles collected (15) and the fine particulates returned to the fluidized bed via line (16).

For problem-free granulate formation, it is essential to coordinate the fluidized bed temperature and the density of the nuclei in the fluidized bed and the rate of spraying with each other. The person skilled in the art can easily determine these parameters in optimizing tests. The temperature of the fluidized bed is preferably maintained between 130° and 300° C. To produce granulates with predominantly a raspberry-like structure, the fluidized bed is generally operated at a lower temperature and higher spray rate than to produce granulates with smooth surfaces. If the density of nuclei is too high, particularly in the event of too high a spray rate, there is a risk of the fluidized bed breaking down due to too great a formation of agglomerates.

In addition, super heated steam may also be used as the drying gas; generally, the same temperatures as above can be utilized, also with slightly reduced pressure. In contrast to circulating air, the process with superheated steam is preferably carried out with a gas scrubber. The water vaporized with the granulation only is conveyed to a condenser and a smaller scrubber.

Figure 2:
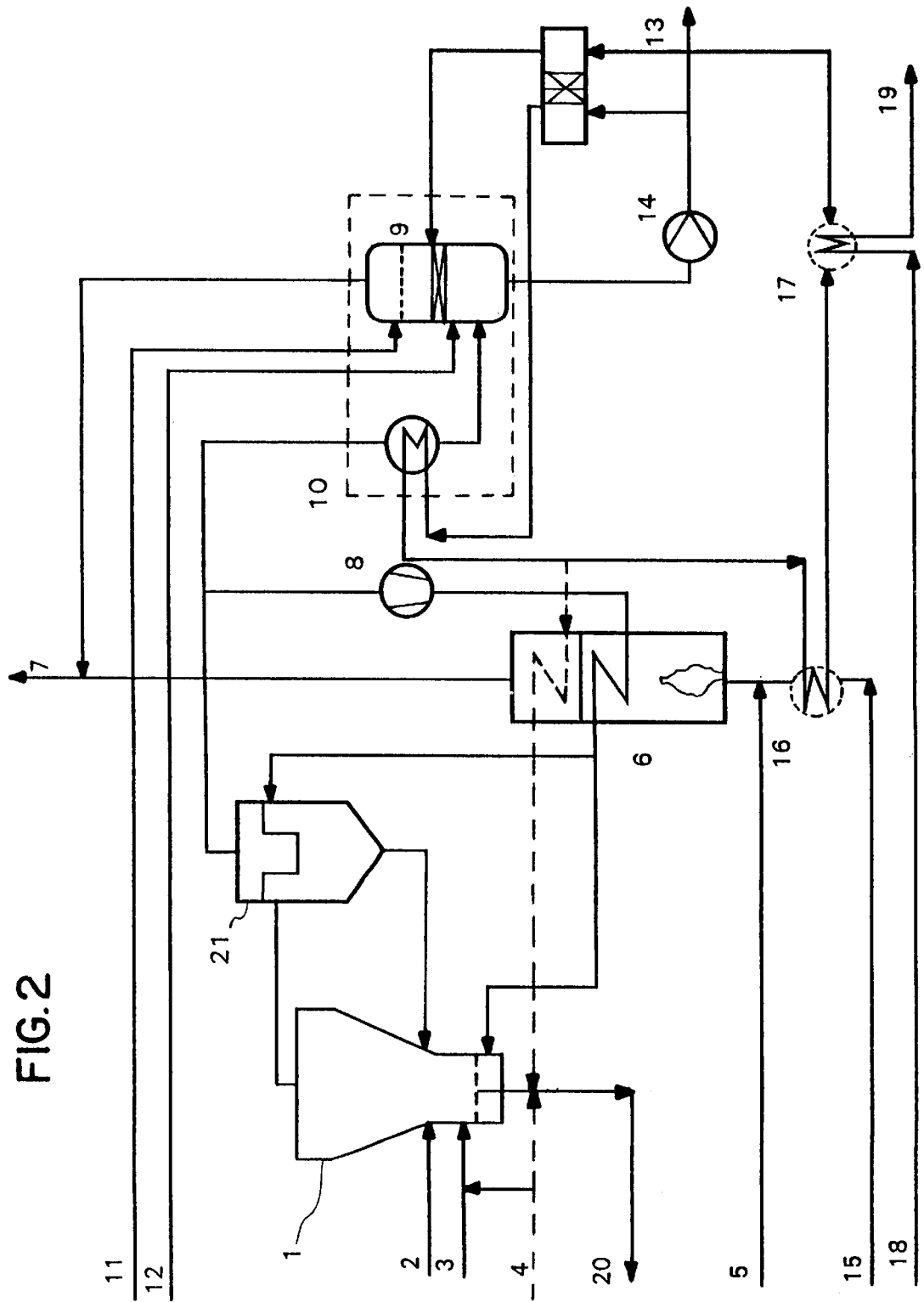
FIG. 2 is a schematic flow diagram of process variations of a fluidized bed spray granulator according to the invention wherein superheated steam is used as the drying gas.

FIG. 2 shows a flow diagram where superheated steam is used as the drying gas. Generally, the steam is bled through a closed circulatory system, excess steam is removed and condensed. The process can be therefor arranged to be free of exhaust gas or a minimum of exhaust gas, which leads to lower investment and plant cost. With the circulatory gas system for the steam stream the exhaust gas is washed, the toal vaporized water of the sodium cyanide solution is free of exhaust gas and is removed and is essentially completely condensed. There are various equipment connections possible, for example one in which the removed filter dust removed from the equipment is added to the removed condensate and the resulting solution after further concentration (e.g., through vacuum vaporization) can be used as an introductory solution for the equipment for the fluidized bed spray granulation. Steam fluidized bed drying (SFBD) has been used in brown coal drying (see C. J. Hamilton, "Steam Fluidized Bed Drying Of Coal", pages 184–188, which is incorporated by reference in its entirety) and the equipment and methods utilized are well known in the art.

In the fluidized bed granulator (1) in FIG. 2, the crystal nuclei (2) and NaCN lye (3) are introduced to the granulator (1). Superheated steam (4) directly enters the fluidized bed or is optionally added with the NaCN lye (3). Superheated steam is produced by natural gas (5) being burned in the burn chamber (6), flue gas (7) exits the burn chamber (6). Fan (8) circulates the circulating gas. Scrubber (9) and condensor (10) are optional. Condensate water (11) and caustic soda (12) enter condenser (10). Waste lye or caustic (13) exits condensor (10) via a pump (14). Combustion air (15) enters optional air preheater (16) and then enters optional secondary cooler (17). Cooling water (18) enters optional secondary cooler (17). Warm water (19) exits optional secondary cooler (17). NaCN granulate (20) exits fluid bed granulator (1). Sifter (21) is provided to filter out fine particulates.

The solution or suspension being sprayed onto or into the fluidized bed preferably has an NaCN or KCN content of 20 to 45% by wt., in particular 30 to 40% by wt. If desired, the solution or suspension also contains additives and/or auxiliary substances for modifying the properties in appropriate effective amounts, these being selected in accordance with the intended application.

It has been found that the average particle size of the alkali metal cyanide granulate can be readily controlled in a directed manner in the cyclonic spray drying operation. This is accomplished by adding to the alkali metal cyanide solution to be sprayed an amount of an alkali metal hydroxide in the range of 1 to 5% by weight, preferably 1.5 to 3% by weight, based on the alkali metal cyanide content. With increasing amounts of alkali metal hydroxide, the particle size of the granulate increases.

In the case of sodium cyanide (NaCN) granulates having a granulate diameter of 1 to 2 mm, the granulate diameter can be increased up to about 3 to 4 mm, if one adds NaOH to the sodium cyanide solution to be sprayed an amount of 1.5 to 2.5% by weight, based on the weight of the sodium cyanide.

It also has been determined that a small amount of alkali metal hydroxide, namely at least about 1% by weight based on the weight of the alkali metal cyanide, should be included in the solution of the alkali metal cyanide to be sprayed in order to avoid discoloration (gray to black) of the granulate.

The following example serves to illustrate this embodiment of the invention:

In a production apparatus as shown in FIG. 1, sodium cyanide granulate were prepared.

First there was introduced a sodium cyanide (NaCN) aqueous solution with a sodium cyanide content of 430 g/l. There was then added to this solution an amount of 7 g. NaOH. The spraying rate was then set at 120 kg/hr.

The granulator was then heated with super heated steam in an amount of 1000–1200 $n^3$/hr.; the temperature at the point of introduction was 380° C. The temperature in the cyclone area was between 200 and 220° C. (dependent on the location of the thermometer).

By operating in this way, it was possible to obtain a sodium cyanide granulate essentially free of color, the formate content and carbonate content of which compared to the material introduced in the solution was unchanged. Over 90% of the granulate particles had a diameter of 1 to 2 mm.

By increasing the NaOH content of the NaCN solution to 10 g/l, the diameter of the NaCN particle can be increased to about 3 to 4 mm.

The solution being sprayed onto the nuclei may be sprayed into the fluidized bed from below, from the side or even from above. It is advantageous to use one or more spray nozzles arranged inside the fluidized bed. Various structural types of nozzle may be used. If the nozzles are located above the fluidized bed, solid-cone nozzles or two-fluid nozzles, for example, may be used; if the nozzles are located within the fluidized bed, two-fluid nozzles with external mixing are preferred. The amount of liquid to be sprayed is adjusted by the person skilled in the art in such a way that stability of the fluidized bed is maintained during the spraying procedure. Here, stability is understood to mean that the number of nuclei remains constant. If the number of nuclei is too low, then it is increased for example by introducing finely divided material from a dust separator and/or a mill which is used to break up oversized particles. In the case of too high a rate of formation of nuclei, the desired particle size is no longer satisfactorily reached and the number of nuclei has to be decreased.

Fluidized bed spray granulation may be performed either batchwise or continuously. Appropriate units are obtainable commercially. In the case of batchwise operation, all of the granulate is withdrawn from the fluidized bed after reaching the desired particle size. A device for continuous fluidized bed spray granulation normally also includes a device for inspecting the granulate. The inspection device may be either integrated into the fluidized bed spray granulation device or arranged outside the same.

It could not have been predicted that alkali metal cyanide granulates according to the present invention with the set of properties described would be obtained by the combination of process features in accordance with the process of the present invention. Furthermore, a person of ordinary skill in the art would not have expected to be able to prepare alkali metal cyanide granulates using fluidized bed spray granulation without considerable hydrolysis to give formate and ammonia taking place, even though moist cyanide is subjected to an elevated temperature for a long period of time (e.g., 0.5 to 4 hours). The rate of dissolution of granulates prepared according to the present invention is in the range of commercially available granulates. This was also surprising because when other products are prepared by fluidized bed spray granulation, such as sodium perborate monohydrate (DE-OS 28 13 326), there is a distinct increase in time of dissolution.

The auxiliary substances for reducing the caking behavior, mentioned previously in the description of the alkali metal cyanide granulates according to the present invention, can be incorporated in the granulates or deposited onto the surface of the same in various ways. If the auxiliary substance is intended to be uniformly distributed in the granulate particles, it is expedient to introduce the auxiliary substance to the fluidized bed spray granulator in the form of an aqueous solution or suspension separated from or already mixed with the aqueous solution which contains the alkali metal cyanide.

In the case of a batchwise operated process, it is generally sufficient to spray the aqueous solution or suspension containing auxiliary substance(s) into the fluidized bed after granulate production has largely finished, so that the auxiliary substance(s) is/are essentially located on the surface of the granulate particles. If the fluidized bed spray granulator is operated continuously, incorporation of the auxiliary substance(s) in uniform distribution takes place in the same way as in the batchwise embodiment. In order to keep the amount of auxiliary substance(s) (e.g., anti-caking agent from the silicate group) small, it is recommended that these substances be applied essentially to the surface of the granulate particles by spraying the granulate leaving the fluidized bed spray granulator with either an aqueous solution or suspension of the auxiliary substance(s) and removing the water introduced in a subsequent drying step. This process may be performed, for example, in a second fluidized bed spray granulator or fluidized bed dryer with a spray device in the first zone. Alternatively, the auxiliary substance(s) may also be applied in the dry form to the granulate withdrawn from the granulator, which has a residual moisture content of up to 5% by wt., by a simple mixing procedure for instance, followed by drying if required.

In addition to the advantageous properties of the granulates prepared according to the present invention, the process has a number of advantages. To perform the process, only a fluidized bed spray granulator with the additive devices which are customary for this type of plant is required, thus reducing the hitherto multi-step process in principle to a one-step process. The process according to the present invention is also distinguished by a low staffing requirement. Shut down times due to repairs or caking up, and thus restrictions on the availability of the plant, are much shorter than has been the case with the technique used in the prior art.

EXAMPLES 1 TO 9

Preparation of Sodium Cyanide Granulate

The fluidizing chamber of a fluidized bed spray granulator consists of a quartz-UV glass vessel with an internal diameter of 150 mm and a length of 530 mm. The flow base is a screen cloth with a mesh of 144 μm. The nozzle (two-fluid nozzle with adjustable air valves) is mounted centrally over the flow base. The distance between the flow base and the nozzle tip is 330 mm.

Upstream of the fluidizing chamber is an air-heater with a temperature regulator and air-flow controller. Downstream of the fluidizing chamber is a settling zone made from stainless steel with a diameter of 300 mm. The current of air then has the dust removed in a stainless steel cyclone. The fine dust which separates out is returned to the fluidizing chamber via a star wheel valve. A waste gas fan with a maximum capacity of 500 $m^3_n$/h draws the air through the fluidizing chamber and cyclone.

To produce an initial bed capable of being readily fluidized, NaCN nuclei with the particle sizes given in Table 1 are used with the initial amount introduced being 500 g. During the start-up procedure for the plant, the fluidized bed is expanded, after exceeding the loosening point for the initial nuclei, by increasing the rate of flow of drying air (rate of flow with respect to the empty pipe cross-section, ca. 3 m/s), in order to produce the requisite density (initial depth to start 330 to 400 mm). 40% by wt. strength aqueous NaCN solution (ca. 23° C.) is sprayed onto the nuclei using a nozzle immersed in the fluidized bed (atomizing pressure 2 bar). The spray droplets meet the floating NaCN nuclei and are distributed onto these by spreading out. The intensive heat and material exchange in the fluidized bed brings about rapid solidification of the liquid film due to drying. During growth of the particles, the fluidized bed is further expanded. After achieving a set diameter, fluidized bed granulation is discontinued and the granulates are removed from the fluidizing chamber.

The operating parameters and material properties are given in Tables 1 and 2.

Further variations and modifications of the foregoing will be apparent to those skilled in the art and such variations and modifications are attended to be encompassed by the claims that are appended hereto.

German priority application P 42 40 576.9, filed on Dec. 4, 1992, is relied on and incorporated by reference.

TABLE 1

|  | Example No. | | | | | | | | |
|---|---|---|---|---|---|---|---|---|---|
|  | 1 | 2 | 3 | 4 | 5 | 6 | 7 | 8* | 9** |
| Operating parameter: | | | | | | | | | |
| Initial temp. of air (° C.) | 250 | 150 | 150 | 250 | 230 | 230 | 250 | 280 | 250 |
| Amount of air ($m_n^3$/h) | 260 | 220 | 393 | 275 | 260 | 260 | 260 | 275 | 390 |
| Temp. of fluidized bed (° C.) | 180 | 90 | 110 | 150 | 150 | 130 | 180 | 180 | 180 |
| Exit temp. of air (° C.) | 146 | 79 | 82 | 124 | 122 | 100 | 146 | 157 | 150 |
| Amount sprayed (l/h) | 5.4 | 6.8 | 11.3 | 13.3 | 8.9 | 12.9 | 5.0 | 8.6 | 5.4 |
| Diameter of nuclei (mm) | 0.5 | 1.4 | 2 | 2 | 3 | 3 | 3 | 1.4 | 4.5–5 |
| Spraying time (min.) | 160 | 55 | 72 | 50 | 41 | 28 | 75 | 97 | 60 |
| Granulate: | | | | | | | | | |
| Shape (R = raspberry) (S = smooth sphere) | S | R | S | R | R | R | S | S | S |
| Diameter (mm) | 2 | 2 | 5–6 | 4–5 | 4.5–5 | 4.5–5 | 4.5–5 | 3 | 6 |
| Bulk density (g/dm³) | 715 | 734 | 798 | 648 | 734 | 740 | 720 | 806 | 652 |

*30% by wt. strength solution of NaCN sprayed in.
**A suspension containing 40% by wt. NaCN and 0.6% by wt. of a (Ca, Na) silicate (Extrusil, Degussa) sprayed onto nuclei from example 7.

TBLE 2

Material properties of the granulates

| Example No. | 2 | 3 | 4 | 5 | 6* | 7 | 8 | 9 | for comparison: milled granulate (commercial product 0.2–4 mm particle range) |
|---|---|---|---|---|---|---|---|---|---|
| Composition (% by wt.) | | | | | | | | | |
| NaCN | 94.2 | 96.5 | 97.1 | 97.4 | 97.2 | 96.9 | 95.5 | n.k. | >98.0 |
| NaOH | 0.5 | 0.7 | 0.7 | 0.3 | 0.7 | 0.3 | 0.3 | n.k. | 0.5 |
| $Na_2CO_3$ | 1.7 | 1.1 | 1.7 | 1.8 | 1.3 | 2.5 | 3.3 | n.k. | 0.4 |
| Na formate | 0.1 | 0.2 | 0.3 | 0.3 | 0.4 | 0.2 | 0.4 | n.k. | 0.3 |
| Resid. moisture | 3.7 | 1.7 | 0.2 | 0.2 | 0.2 | 0.05 | 0.05 | n.k. | <0.1 |
| Abrasion (%) | 0.1 | <0.05 | 0.4 | 0.3 | <0.05** | <0.05 | <0.05 | <0.1 | 2–3 |
| Caking index | 4 | 4 | 3 | 4 | 1(2) | 3(4) | n.k. | 2 | 6(5) |
| Breaking strength (N) | n.k. | n.k. | n.k. | 17 | 14 | 24 | 12 | 52 | n.k. |
| Rate of dissolution | 50 | 105 | 85 | 75 | 75 | 70 | 50 | n.k. | 70 |

TBLE 2-continued

Material properties of the granulates

| Example No. | 2 | 3 | 4 | 5 | 6* | 7 | 8 | 9 | for comparison: milled granulate (commercial product 0.2–4 mm particle range) |
|---|---|---|---|---|---|---|---|---|---|
| (sec) to prepare a 0.1% strength solution at 20° C. | | | | | | | | | (particles >1 mm) |

*Granulate was mixed with 2% silicate (Extrusil, Degussa) after withdrawal from the reactor.
**Measured using Si-free sample.
n.k. = not known.

What is claimed:

1. A process for preparing an alkali metal cyanide granulate comprising sodium cyanide or potassium cyanide, said granulate having the following properties:
   (i) essentially spherical particles;
   (ii) particle diameter in the range from at least 0.1 mm to 20 mm for at least 99% by wt. of said granulate;
   (iii) a bulk density of at least 600 g/dm$^3$;
   (iv) an abrasion of less than 1% by wt.; and
   (v) a caking index of at most 4,
wherein said process comprises (a) spraying an aqueous solution or suspension comprising at least 10% by wt. of sodium or potassium cyanide onto a fluidized bed of alkali metal cyanide nuclei, (b) evaporating water by flowing a current of drying gas whose initial temperature is 150° to 450° C. through said fluidized bed whose temperature is 90° to 350° C., (c) recovering the resulting granulate, and (d) optionally returning dust to said device.

2. The process according to claim 1, wherein said aqueous solution or suspension contains 20–45% by wt. of sodium or potassium cyanide.

3. The process according to claim 2, wherein said aqueous solution or suspension contains 30–40% by wt. of sodium or potassium cyanide.

4. The process according to claim 1, wherein the temperature of said fluidized bed is 130° to 300° C.

5. The process according to claim 1, wherein the initial temperature of said drying gas is >200°.

6. The process according to claim 1, wherein said alkali metal cyanide nuclei have a particle diameter of at least 500 μm.

7. The process according to claim 1, wherein said aqueous solution or suspension further comprises alkali metal hydroxide in an amount of up to 3% by wt. with reference to said cyanide.

8. The process according to claim 1, wherein said aqueous solution or suspension further comprises an anti-caking agent.

9. The process according to claim 1, further comprising after step (c) treating said granulate with an anti-caking agent by mixing said granulate with said anti-caking agent which is added dry or in the form of an aqueous suspension and optionally drying.

10. The process according to claim 1, wherein the final temperature of said drying gas is between 70° and 300° C.

11. The process according to claim 10, wherein the final temperature of said drying gas is above 110° C.

12. The process according to claim 1, wherein said drying gas is superheated steam.

13. The process according to claim 1, wherein said essentially spherical particles have a smooth or raspberry-like surface structure.

14. A process for preparing an alkali metal cyanide granulate comprising sodium cyanide or potassium cyanide, said granulate having the following properties:
   (i) essentially spherical particles;
   (ii) particle diameter in the range from at least 0.1 mm to 20 mm for at least 99% by wt. of said granulate;
   (iii) a bulk density of at least 600 g/dm$^3$;
   (iv) an abrasion of less than 1% by wt.; and
   (v) a caking index of at most 4,
wherein said granulate further comprises an anti-caking agent uniformly distributed in said granulate particles or essentially on the surface of said granulate particles; wherein said anti-caking agent is selected from the group consisting of hydrophobic organic compounds, natural and synthetic silicas, and natural and synthetic silicates; and wherein said granulate has an alkali metal cyanide content of at least 80% by wt;
   wherein said process comprises (a) spraying an aqueous solution or suspension comprising at least 10% by wt. of sodium or potassium cyanide onto a fluidized bed of alkali metal cyanide nuclei, (b) evaporating water by flowing a current of drying gas whose initial temperature is 150° to 450° C. through said fluidized bed whose temperature is 90° to 350° C., (c) recovering the resulting granulate, and (d) optionally returning dust to said device, wherein said aqueous solution or suspension further comprises an anti-caking agent and/or said process further comprises after step (c) treating said granulate with an anti-caking agent by mixing said granulate with said anti-caking agent which is added dry or in the form of an aqueous suspension and optionally drying.

15. The process according to claim 14 wherein said drying gas is superheated steam.

16. The process according to claim 1 further comprising adding to the alkali metal cyanide solution to be sprayed a sufficient amount of alkali metal hydroxide to control the desired particle size of the granulates.

17. The process according to claim 16 where the amount of alkali metal hydroxide is 1 to 5% by weight based on the alkali metal cyanide content.

18. The process according to claim 14 further comprising adding to the alkali metal cyanide solution to be sprayed a sufficient amount of alkali metal hydroxide to control the desired particle size of the granulates.

19. The process according to claim 18 where the amount of alkali metal hydroxide is 1 to 5% by weight based on the alkali metal cyanide content.

20. A process for preparing an alkali metal cyanide granulate comprising sodium cyanide or potassium cyanide and controlling the size of the granulate, said granulate having the following properties:

(i) essentially spherical particles;

(ii) particle diameter in the range from at least 0.1 mm to 20 mm for at least 99% by wt. of said granulate and which is larger in size than particles not treated in accordance with this process;

(iii) a bulk density of at least 600 g/dm$^3$;

(iv) an abrasion of less than 1% by wt.; and (v) a caking index of at most 4, wherein said process comprises (a) spraying an aqueous solution or suspension comprising at least 10% by wt. of an alkali metal cyanide selected from the group consisting of sodium cyanide and potassium cyanide into a fluidized bed of alkali metal cyanide nuclei, the aqueous solution also containing an amount of alkali metal hydroxide to increase the particle diameter compared to particles made with solutions free of alkali metal hydroxide (b) evaporating water by flowing a current of drying gas whose initial temperature is 150° C. to 450° through said fluidized bed whose temperature is 90° C. to 350° C., (c) recovering the resulting granulate of increased particle diameter, and (d) optionally returning dust to said device.

21. The process according to claim 12, wherein said super-heated steam is circulated in a closed circuit, and essentially only the excess steam is released from said circuit.

22. The process according to claim 21, further comprising:

(e) conveying a portion of steam, which has passed through a fluidized bed, through a burning chamber to thereby generate said super-heated steam and conveying said super-heated steam to said fluidized bed, wherein said excess steam is washed or condensed.

23. The process according to claim 16, wherein said drying gas is super heated steam.

24. The process according to claim 16, wherein said super-heated steam is circulated in a closed circuit, and essentially only the excess steam is released from said circuit.

* * * * *